United States Patent
Lougee (10) Patent No.: US 7,441,129 B2
(45) Date of Patent: Oct. 21, 2008

(54) REGULATOR FOR REDUCING POWER SUPPLY TRANSIENT VOLTAGES

(75) Inventor: Eldin Lougee, Hillsboro, OR (US)

(73) Assignee: International Rectifier Corporation, El Segundo, CA (US)

( * ) Notice: Subject to any disclaimer, the term of this patent is extended or adjusted under 35 U.S.C. 154(b) by 412 days.

(21) Appl. No.: 11/205,712

(22) Filed: Aug. 17, 2005

(65) Prior Publication Data

US 2006/0041770 A1 Feb. 23, 2006

Related U.S. Application Data

(60) Provisional application No. 60/602,246, filed on Aug. 17, 2004.

(51) Int. Cl.
G06F 1/00 (2006.01)
G06F 1/26 (2006.01)

(52) U.S. Cl. .................. 713/300; 713/310; 713/320; 713/340

(58) Field of Classification Search .............. 713/300
See application file for complete search history.

(56) References Cited

U.S. PATENT DOCUMENTS

| | | | | |
|---|---|---|---|---|
| 5,212,616 A | * | 5/1993 | Dhong et al. | 361/18 |
| 5,379,174 A | * | 1/1995 | Kasamoto | 361/56 |
| 5,691,870 A | * | 11/1997 | Gebara | 361/86 |
| 5,926,394 A | * | 7/1999 | Nguyen et al. | 716/1 |
| 6,472,899 B2 | * | 10/2002 | Osburn et al. | 324/765 |

FOREIGN PATENT DOCUMENTS

| | | |
|---|---|---|
| JP | H11-134069 | 5/1999 |
| JP | 2002-135968 | 5/2002 |
| WO | WO 2004/062072 | 7/2004 |

OTHER PUBLICATIONS

Official Letter in corresponding Japanese Patent Application No. 2005-236,221 (English translation). Date not known.

* cited by examiner

*Primary Examiner*—Rehana Perveen
*Assistant Examiner*—Stefan Stoynov
(74) *Attorney, Agent, or Firm*—Ostrolenk, Faber, Gerb & Soffen, LLP (57) ABSTRACT

A regulator for reducing transient voltages at a power supply output includes a switch connected between ground and the power supply output and a comparator for controlling the opening/closing of the switch. The comparator includes an input for sensing a power supply output voltage and an input for receiving a reference voltage. When the output voltage exceeds the reference voltage by a threshold, for example, the comparator operates to close the switch, shunting excess energy in the power supply to ground and reducing the output voltage. As the output voltage returns to within the threshold of the reference voltage, for example, the comparator operates to open the switch, permitting the power supply to resume normal operation. The power supply may power a microprocessor that is susceptible to voltage transients that occur as the processor power demands change. The regulator compensates for these transients and maintains the power supply output voltage within desired specifications.

14 Claims, 6 Drawing Sheets

REGULATOR FOR REDUCING POWER SUPPLY TRANSIENT VOLTAGES

RELATED APPLICATIONS

This application is based on and claims priority to U.S. Provisional Application No. 60/602,246, filed on Aug. 17, 2004, by Eldin Lougee, entitled "ENERGY WASTE-GATE IC," the contents of which are herein incorporated by reference.

BACKGROUND OF THE INVENTION

1. Field of the Invention

The present invention relates to a regulator for a power supply, and in particular, relates to a regulator that compensates for voltage transients at the power supply output.

2. Description of Related Art

A number of advanced microprocessors presently available, such as mobile processors, support power management features with the purpose, for example, of conserving power consumption. In particular, these microprocessors have the ability to dynamically switch between several different operating frequencies. For example, a microprocessor may operate at a high frequency mode for handling instructions and commands as needed, and then switch to a lower frequency mode (e.g., an idle or sleep mode) when the demands on the microprocessor are reduced or cease altogether. Notably, as these microprocessors switch between frequency modes, the operating voltages and current demands of the microprocessor core changes, with the lower frequency modes having lower demands. Accordingly, by switching to a lower frequency mode as performance needs change, these microprocessors are able to reduce their power needs and thereby power consumption, conserving power. Notably, it is not uncommon to operate these advanced microprocessors with thousands of idle modes, for example, realized for every second of operation in order to reduce power consumption.

An advanced microprocessor as described above presents a complicated load to the power supply providing power to the microprocessor core. In particular, as the microprocessor switches between frequency modes, a large differential in power requirements occurs as the core's voltage and current needs change. In addition, the microprocessor core requires a precisely regulated voltage. For example, a power supply must typically maintain its output voltage within a tolerance band of +50 millivolts, for example, of the microprocessor's desired operating voltage for the present frequency mode (hereinafter, this desired operating voltage will also be referred to as a "voltage set-point"). Accordingly, as a microprocessor varies its frequency mode, the power supply must vary its output power while also continuing to maintain a precise output voltage within the voltage tolerance band of the microprocessor.

Figure 1:
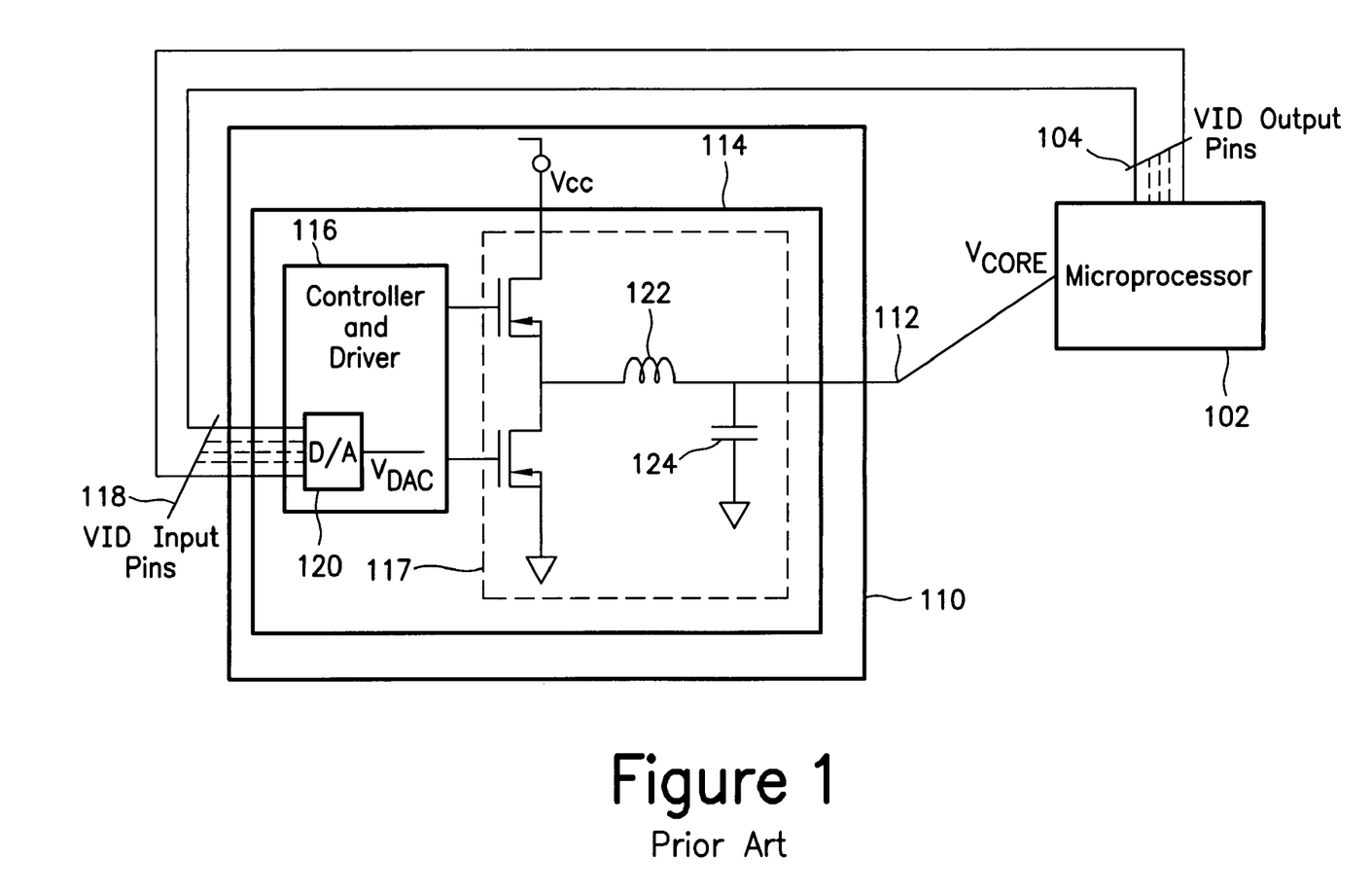
FIG. 1 shows a block diagram of a prior art power supply system for supplying power to a microprocessor.

Referring to FIG. 1 there is shown an example advanced microprocessor 102 interfaced to a power supply 110 that includes a power supply output 112 interfaced to the microprocessor for providing power to the microprocessor core. As illustrated, the power supply may include a voltage regulator 114 capable of generating a large amount of power and providing a precisely regulated output voltage ($V_{CORE}$) at output 112, as required by microprocessor 102. The voltage regulator may be, for example, a buck voltage regulator that includes a controller 116 with one or more internal drivers (although the drivers may also be external) for driving one or more output stages 117, depending on whether a multi-phase or single-phase configuration is used (for simplicity, only a single phase is shown in FIG. 1). As the microprocessor operates, voltage regulator 114 supplies current and a precisely regulated voltage to the processor, with a majority of the generated energy being stored in output inductors, represented by inductor 122. The output of the inductors is typically transferred to output capacitors, represented by capacitor 124, which are selected to have a low ESR (Equivalent Series Resistance) for generating a highly precise output voltage $V_{CORE}$ to the microprocessor core.

As also illustrated in FIG. 1, advanced microprocessors typically provide multiple voltage indication (VID) output pins 104 (e.g., six VID pins). The microprocessor uses these pins to produce a VID signal, which is a digital representation of the desired voltage set-point the microprocessor core requires at power supply output 112 as the microprocessor switches between frequency modes. Controllers, such as controller 116, that are designed to operate with advanced microprocessors also have corresponding VID input pins 118. In operation, VID output pins 104 of microprocessor 102 are connected to VID input pins 118 of controller 116, thereby allowing the microprocessor to signal the controller with the desired voltage set-point as the microprocessor changes frequency modes. VID input pins 118 may be interfaced to a digital-to-analog converter 120, for example, that converts the digitally represented voltage set-point to an analog reference voltage. Thereafter, the controller controls/drives output stages 117 to maintain this voltage at power supply output 112, as requested by the microprocessor.

As indicated above, advanced microprocessors dynamically switch between different frequency modes in order to conserve power consumption. More specifically, as microprocessor 102 switches from a higher frequency mode to a lower frequency mode, the processor generates a VID signal at VID pins 104 in order to signal controller 116 of the new/reduced voltage set-point, thereby causing controller 116 to drive output stages 117 to reduce the power level at output 112. Similarly, as the microprocessor switches from a lower frequency mode back to a higher frequency mode, the processor signals controller 116 to provide an increased power level at output 112.

Significantly, as a result of microprocessor 102 shifting its power level demands from power supply 110, the power supply is subject to voltage transients at output 112. For example, as microprocessor 102 switches from a high frequency mode to a lower frequency mode and signals a reduced voltage set-point to controller 116, the controller controls output stage 117 to produce less power. As this occurs, inductors 122 are supplied with less current as the output stages adjust, causing the inductors to dissipate their stored energy. This dissipation of stored energy creates a step unload transient in the current. As the inductors discharge, their stored energy is transferred to capacitors 124, which can cause the output voltage of the power supply to momentarily rise, thereby creating a voltage transient. The size of this voltage transient is dependent, for example, on capacitors 124 and on the magnitude of the change in voltage set-point as signaled by microprocessor 102.

Of particular concern is when microprocessor 102 switches from a high frequency mode to a low frequency mode, such as an idle mode, and requests a large change in the voltage set-point. At this time, a high step current transient can be created. Notably, if power supply 110 is not capable of compensating for this large current transient, a large rise in the output voltage at power supply output 112 can result as inductors 122 transfer energy to capacitors 124. As the output voltage rises, an overshoot may occur that may possibly exceed the operating specifications of the microprocessor.

For example, microprocessor 102 may have a tolerance band of +50 mV of the processor's voltage set-point and may be able to sustain a maximum overshoot of this size for 25 us, for example. If the voltage regulator does not compensate for the step current transient, the power supply output voltage may exceed such specifications, leading to long term reliability issues or permanent damage to the microprocessor.

For example, a high voltage on the power supply output beyond the specification ranges of the microprocessor can damage semiconductor layers such as oxides, leading to problems with reliability of the semiconductor device. Alternately, a high voltage on the power supply output outside of the specification ranges may permanently damage the processor leading to catastrophic failure. Accordingly, the microprocessor must be protected from over voltage and under voltage conditions within a precise tolerance during the transient states caused by step unload operations.

Notably, the overshoot problem described above also occurs for desktop and server-based microprocessors that operate at a constant frequency mode and a constant operating voltage/voltage set-point. Specifically, even though these microprocessors operate at a constant frequency and voltage, they move between states of high computational workload and idle states. As these microprocessors move to an idle state, the processor's current load decreases, leading to similar current and thereby voltage transients as described above. Again, these microprocessors must be protected from overshoot conditions within a precise tolerance during the transient states caused by step unload operations. (Note that desktop and server-based microprocessors may also provide VID output pins and use these pins to specify to a voltage regulator the processor's desired/constant voltage set-point).

One way for power supply 110 to avoid excessive voltages on power supply output 112 is to provide additional components, such as capacitors. The intent of these additional capacitors is to absorb the excess energy available in the inductors, dampening the transient experienced during the step unload operation while also maintaining a precise power supply output voltage. However, these additional capacitors need to have a low ESR in order to maintain a precise power supply output voltage and are thereby expensive. This additional expense can represent a large cost with respect to an overall system.

Advanced microprocessors, such as microprocessor 102, may also avoid excessive voltages on the power supply output by changing their frequency mode in a step-wise fashion from the present operating frequency to the desired operating frequency. In other words, as indicated above, advanced microprocessors often provide numerous operating frequencies, each with a different operating voltage. The operating voltages for each of the operating frequencies may be separated by 12.5 mV steps, for example. Accordingly, the microprocessor may incrementally drop its operating frequency in step-wise fashion, signaling controller 116 through VID pins 104 to incrementally drop the power supply output voltage (i.e., move the voltage set-point downward in 12.5 mV steps, for example). Between each incremental step downward, the microprocessor may allow for settling time before moving to the next step. By moving in incremental steps with settling times, the step current transients are reduced, making it easier for power supply 110 to compensate for the transients and maintain a precise output voltage at output 112. However, moving between operating frequencies in a step-wise fashion is slow and inefficient.

SUMMARY OF THE INVENTION

Accordingly, it is desirable to provide a system and method that compensates for transient voltages on a power supply output and that overcomes the above and other disadvantages of the prior art. According to an embodiment of the invention, a regulator is connected to the output of a microprocessor power supply in order to sense voltage transients in the power supply output voltage as the microprocessor moves from higher to lower frequency modes or reduces its computational workload, thereby reducing its power demands. As the regulator senses voltage transients, it operates to reduce these transients and maintain the output voltage within the desired specifications of the microprocessor. Accordingly, the regulator operates as an additional regulator for the power supply in addition to the power supply's voltage regulator and in particular, operates to prevent a voltage overshoot of the power supply and helps to maintain the precision output voltage the microprocessor requires as the microprocessor varies its power demands.

According to an embodiment of the invention, the regulator includes a ground path switch connected between the output of the power supply and ground. The regulator further includes an energy waste-gate that operates the opening and closing of the ground path switch based on comparisons between the power supply output voltage and the microprocessor's desired voltage set-point. In particular, the waste-gate may include a first input connected to the output of the power supply to sense the power supply output voltage and a second input to receive as a reference voltage the microprocessor's desired voltage set-point. According to an embodiment of the invention, the waste-gate obtains the voltage set-point from the controller of the power supply voltage regulator. For example, the controller may convert a microprocessor's VID signal, which specifies the microprocessor's voltage set-point, to an analog form and provide this analog voltage to the waste-gate. According to another embodiment of the invention, the waste-gate may interface to the VID output pins of the microprocessor through a digital-to-analog converter, for example, in order to obtain the voltage set-point. According to another embodiment of the invention, the voltage set-point of the microprocessor may be pre-configured within the waste-gate.

As indicated, as the microprocessor reduces its frequency mode/workload and thereby its power level demands, it causes a step unload transient in the current as the inductors discharge. As this stored energy is transferred to the capacitors, the output voltage of the power supply rises, creating a voltage transient. According to an example operation of the present invention, the waste-gate senses the microprocessor's desired voltage set-point and also senses the rise in output voltage at the power supply output. When the power supply output voltage exceeds the voltage set-point by a threshold, for example, the waste-gate switches the ground path switch on, thereby shunting the power supply output to ground. As this occurs, the excess energy from the inductors is drained from the power supply output, thereby preventing the output voltage from rising further and maintaining the power supply output voltage within the desired specifications of the microprocessor and avoiding a voltage overshoot. As the difference between the output voltage and voltage set-point returns towards the threshold, for example, the waste-gate switches the ground path switch off, thereby opening the ground path for the power supply output and permitting the power supply to resume normal operation.

Accordingly, the regulator acts as an additional regulator for the power supply to reduce/compensate for voltage transients that may result as the microprocessor varies frequency modes, thereby preventing overshoot. Advantageously, the regulator reduces the requirement for output capacitors with a low ESR on the power supply output that would otherwise be required to compensate for the voltage transients. By reducing the required output capacitance, a simpler voltage regulator design is possible and the system costs can be reduced. In addition, the regulator of the present invention is fast acting (e.g., less than 25 us), quickly draining the excess energy from the power supply output. Accordingly, the regulator allows an advanced microprocessor, for example, to make larger and faster switches between operating frequencies, thereby operating more efficiently and consuming less power.

According to an example implementation of the regulator according to an embodiment of the invention, the ground path switch may be a transistor or MOSFET and the waste-gate may be a gate driver and a voltage comparator that switches with hysteresis, for example. The waste-gate may be implemented as an integrated circuit.

Other features and advantages of the present invention will become apparent from the following description of the invention, which refers to the accompanying drawings.

DESCRIPTION OF THE EMBODIMENTS

Referring to FIGS. 2A, 2B, 2C, and 2D, there is shown regulator 200 according to an embodiment of the invention. Regulator 200 includes energy waste-gate 202 and ground path switch 210. Switch 210 may include an input lead 211 connected to output 112 of power supply 110, an output lead 212 connected to ground, and a control lead 213 connected to an output 208 of energy waste-gate 202. Through the control of switch 210, the switch provides a switchable path to ground for power supply output 112.

Energy waste-gate 202 may include a sense line input lead 204, a reference line input lead 206, and an output lead 208. Output lead 208 is connected to control lead 213 of switch 210 and in this way, waste-gate 202 controls switch 210, opening and closing the path to ground. Waste-gate 202 uses reference line 206 to sense the desired operating voltage (i.e., the desired voltage set-point) that a microprocessor requires at the power supply output 112. As indicated, this voltage set-point may be constant or may vary, as is the case with an advanced microprocessor 102 that varies its voltage set-point as it varies frequency modes. Sense line 204 is connected to power supply output 112. In this way, waste-gate 202 senses the power supply output voltage. As further described below, waste-gate 202 operates as a comparator and compares the power supply output voltage obtained from sense line 204 against the voltage set-point of the microprocessor as obtained from reference line 206 and controls ground path switch 210 to connect power supply output 112 to ground as the output voltage exceeds the voltage set-point. With the provision of the path to ground, excess energy in the power supply is drained and the output voltage on output 112 reduces back towards the voltage set-point. As this occurs, waste-gate 202 closes the ground path switch 210. In this way, regulator 202 compensates for voltage transients on the power supply output and thereby provides additional regulation for the power supply, helping to maintain the power supply output voltage within the microprocessor specifications.

Figure 2A:
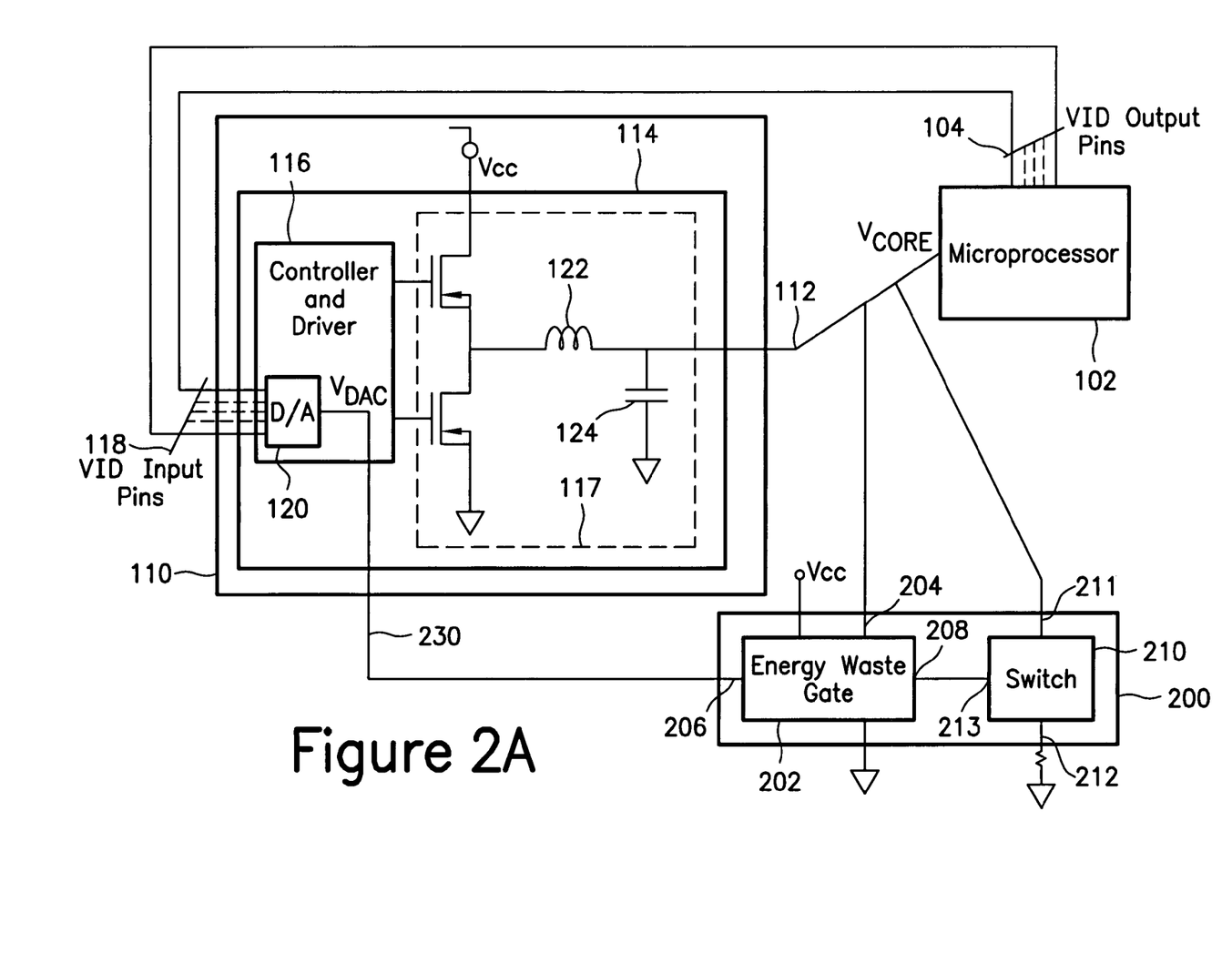
FIGS. 2A, 2B, 2C, and 2D show block diagrams of a regulator for compensating for transient voltages at the output of a microprocessor power supply according to embodiments of the invention.

According to an embodiment of the invention and as illustrated in FIG. 2A, waste-gate 202 may obtain from controller 116 the microprocessor's desired operating voltage/voltage set-point. More specifically, as indicated above, some microprocessors provide controller 116 with a VID signal representing the desired voltage set-point the voltage regulator needs to provide at output 112. Advanced microprocessors, such as microprocessor 102, will vary this VID signal as the microprocessor changes frequency modes. Other microprocessors that do not alter their frequency mode will hold the VID signal constant. Controller 116 may include a digital-to-analog converter 120 to convert the VID signal to an analog voltage that is representative of the voltage set-point as specified by the microprocessor, this analog voltage being represented by voltage $V_{DAC}$ in FIG. 2A. According to an embodiment of the invention, controller 116 may provide access to $V_{DAC}$ through an access pin 230 to which reference line 206 can be interfaced, thereby obtaining the voltage set-point.

It should be noted that some advanced controllers 116 use what is referred to as droop voltage regulation. Through this function, the controller attempts to prevent voltage transients that occur at output 112 of the power supply from overshooting the microprocessor specifications as the microprocessor varies its power demands (i.e., the problem described above). For example, to help prevent the output voltage from overshooting the microprocessor specifications as the microprocessor, like processor 102, drops frequency modes, the controller biases the voltage set-point downward and drives the voltage regulator output stages 117 to produce this biased voltage. The bias can be referred to as "droop". Hence, the controller drives the output stages at "voltage set-point-droop". This negative bias gives the voltage regulator headroom and helps to maintain the output voltage within the microprocessor specifications as the processor lowers it frequency mode and causes a positive output voltage transient. Accordingly, when a controller includes a droop function, the controller uses "voltage set-point-droop" as the reference voltage to be driven at the power supply output 112. Note that the droop is based on a sloping current load line and increases linearly with current loading. Accordingly, the controller varies the droop value with the current load and may, at times, set the droop to null if the processor is operating at a state of providing no load.

Figure 2B:
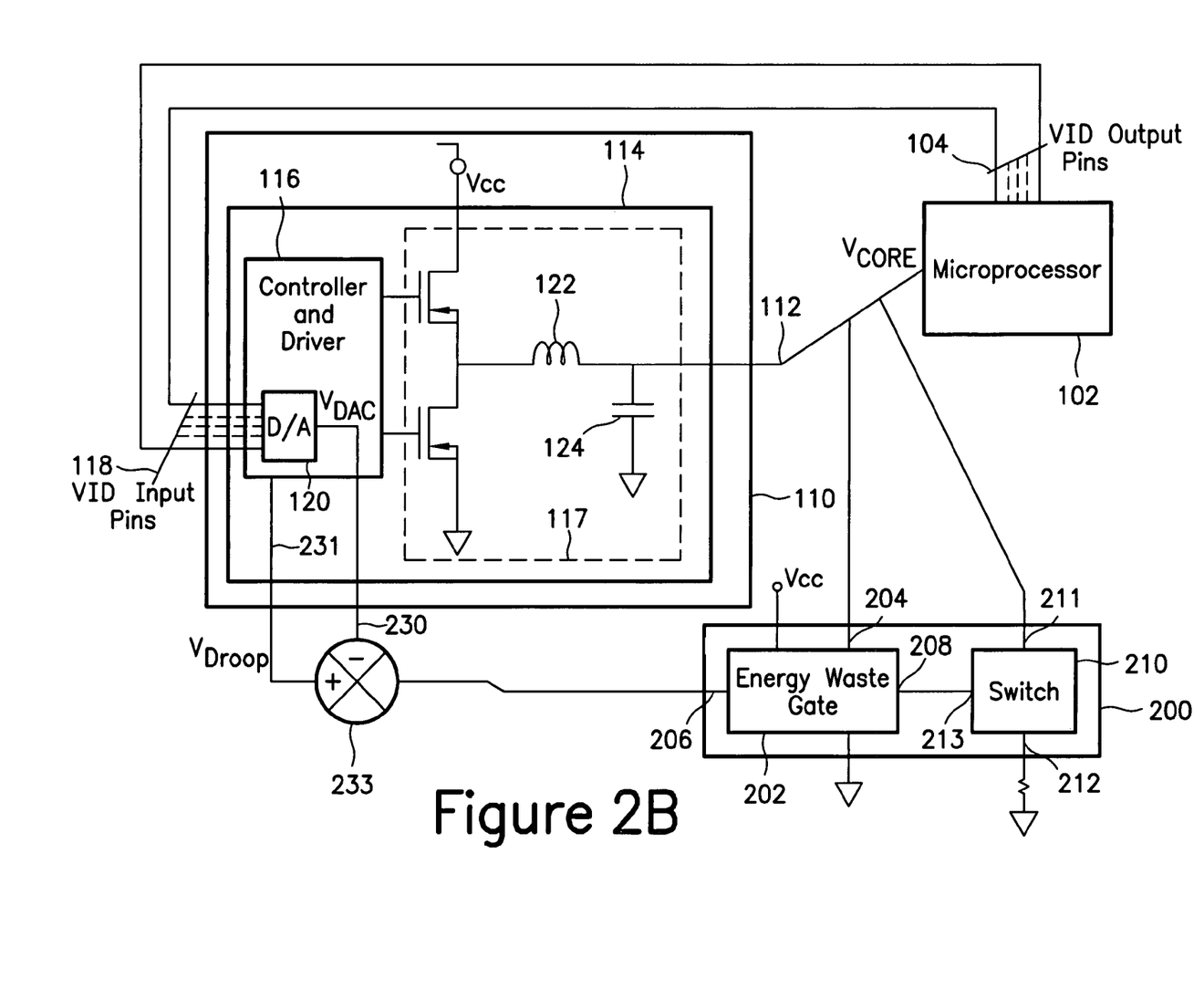

According to an embodiment of the invention and as illustrated in FIG. 2B, when a controller includes a droop function, waste-gate 202 may use "voltage set-point-droop" as the reference voltage at reference line 206, rather than just the voltage set-point. As an example, controller 116 may provide access to the droop value, represented as $V_{Droop}$ in FIG. 2B, through an access pin 231. Here, a subtraction module 233, for example, may be provided and interfaced to pins 230 and 231 of controller 116 to provide $V_{DAC}$-$V_{Droop}$, with the result of this operation being forwarded to reference line 206.

Figure 2C:
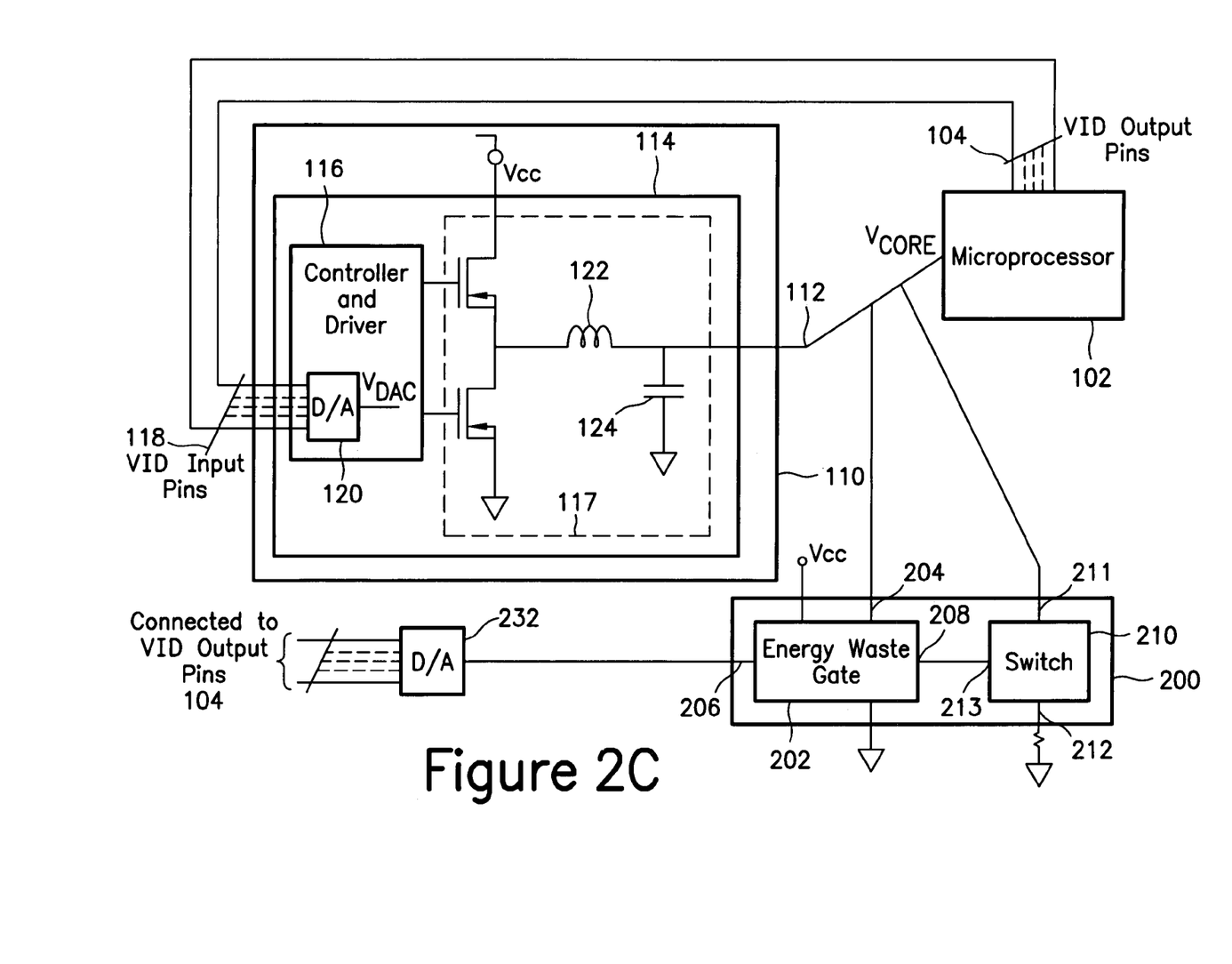

According to another embodiment of the invention and as illustrated in FIG. 2C, reference line 206 may interface VID output pins 104 of microprocessor 102 through digital-to-analog converter 232, for example, in order to obtain the voltage set-point. Digital-to-analog converter 232 converts the microprocessor's VID signal to an analog form. Here, reference line 206 is connected to the output of the digital-to-analog converter. Digital-to-analog converter 232 may be external to the waste-gate, as illustrated in FIG. 2C. Alternatively, converter 232 may be internal to waste-gate 202. When the converter is internal to the waste-gate, the waste-gate would provide multiple VID input pins, rather than reference line 206, in order to interface with microprocessor 102.

Figure 2D:
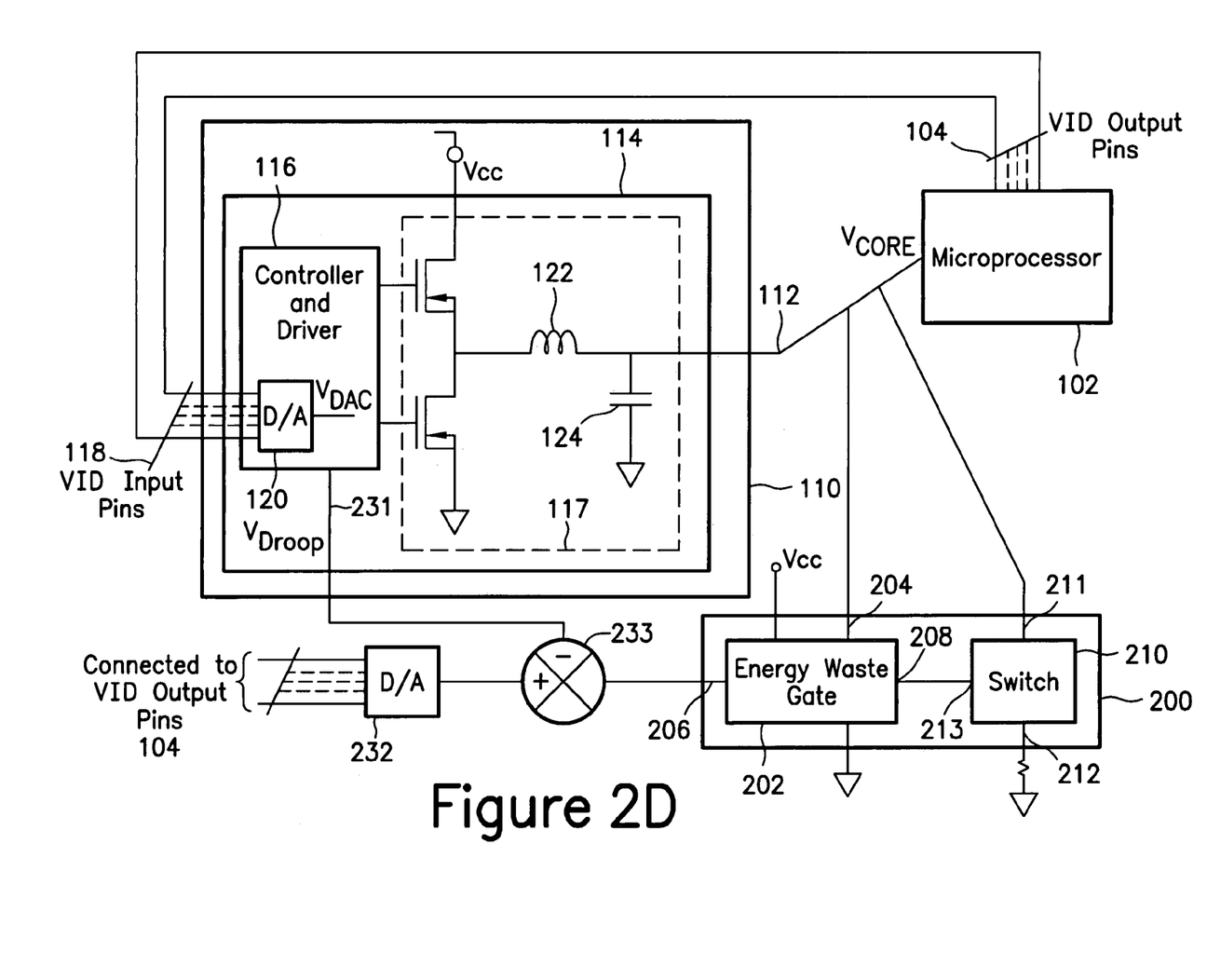

According to another embodiment of the invention and as illustrated in FIG. 2D, if controller 116 includes a droop function as described above, waste-gate 202 may obtain the voltage set-point from the microprocessor, as shown in FIG. 2C, and may obtain $V_{Droop}$ from the controller, as shown in FIG. 2B. Here, a subtraction module 233 may be provided and interfaced to the output of digital-to-analog converter 232 and to pin 231 of the controller with the output of module 233 being forwarded to reference line 206.

According to another embodiment of the invention, waste-gate 202 may not dynamically obtain the microprocessor's voltage set-point through the VID pins as described above. Rather, waste-gate 202 may be pre-configured with a microprocessor's voltage set-point (note that this embodiment may be applicable to processors that do not change their voltage set-point).

According to an example operation of regulator 200 according to an embodiment of the invention, energy waste-gate 202 continuously compares the output voltage of power supply 110, as sensed through sense line 204, against the microprocessor's desired voltage set-point, as sensed through reference line 206 (possibly biased with a droop bias). In general, when the power supply output voltage exceeds the voltage set-point, for example, waste-gate 202 switches ground path switch 210 on, thereby providing a path to ground for the power supply output 112. With the provision of the path to ground, excess energy in the power supply is drained and the output voltage on output 112 is prevented from rising further and begins to reduce, bringing the voltage on the power supply output back towards the voltage set-point. Once the voltage on the power supply output 112 returns back to the voltage set-point, for example, waste-gate 202 switches ground path switch 210 off, thereby eliminating the path to ground for the power supply output.

According to an embodiment of the invention, waste-gate 202 is configured to switch ground path switch 210 on when the power supply output voltage exceeds the voltage set-point by a threshold. As an example, the threshold may be set to the maximum allowable overshoot of the microprocessor, for example, +50 mV. According to an aspect of the invention, this threshold may be configurable within waste-gate 202. According to another embodiment of the invention, waste-gate 202 is configured to switch with hysteresis about the threshold. According to another aspect of the invention, the hysteresis is adjustable.

Accordingly, regulator 200 operates as an additional regulator for power supply 110 in addition to voltage regulator 114 and in particular, operates to prevent a voltage overshoot of the power supply and helps to maintain the precision output voltage the microprocessor requires as the microprocessor varies its power demands. Specifically, as indicated above, as a microprocessor reduces its frequency mode/voltage set-point or computational workload and thereby its power level demands, it causes a step unload transient in the current as inductors 122 discharge. As this stored energy is transferred to capacitors 124, the output voltage of the power supply begins to rise as the capacitors charge, creating a voltage transient. If not compensated, this voltage transient can exceed the voltage tolerance of the microprocessor and result in an overshoot.

According to the invention, waste-gate 202 senses the microprocessor's voltage set-point on reference line 206 and also senses, through sense line 204, the rise in output voltage at output 112 as inductors 122 discharge. When the power supply output voltage exceeds the voltage set-point by a threshold, for example, waste-gate 202 switches ground path switch 210 on, thereby shunting the power supply output 112 to ground. As this occurs, the excess energy from inductors 122 is drained from the power supply output, thereby preventing the output from rising further and maintaining the power supply output voltage within the desired specifications of the microprocessor and avoiding a voltage overshoot. As the voltage on the power supply output 112 returns to within the threshold value of the voltage set-point, for example, waste-gate 202 switches ground path switch 210 off, thereby opening the ground path for the power supply output and permitting the power supply to resume normal operation.

Accordingly, regulator 200 acts as an additional regulator for power supply 110 to reduce/compensate for voltage transients that may result as microprocessor 102 varies its power level demands, thereby preventing overshoot. Advantageously, regulator 200 permits a reduction in the output capacitance for the voltage regulator output stages 117 that would otherwise be required to compensate for the voltage transients. As indicated, when such capacitance is included, the capacitors typically have a low ESR and are thereby expensive. By reducing the required output capacitance, regulator 200 provides cost savings and allows for a simpler voltage regulator design, while also leading to additional efficiencies through a reduction of output impedance.

In addition, regulator 200 is fast acting (e.g., less than 25 us), quickly draining the excess energy from the power supply output. Accordingly, regulator 200 allows a microprocessor, like microprocessor 102, to make larger and faster switches between operating frequencies without the voltage supply output exceeding the voltage specifications of the processor. Accordingly, microprocessor 102 can operate more efficiently and consume less power.

Figure 3:
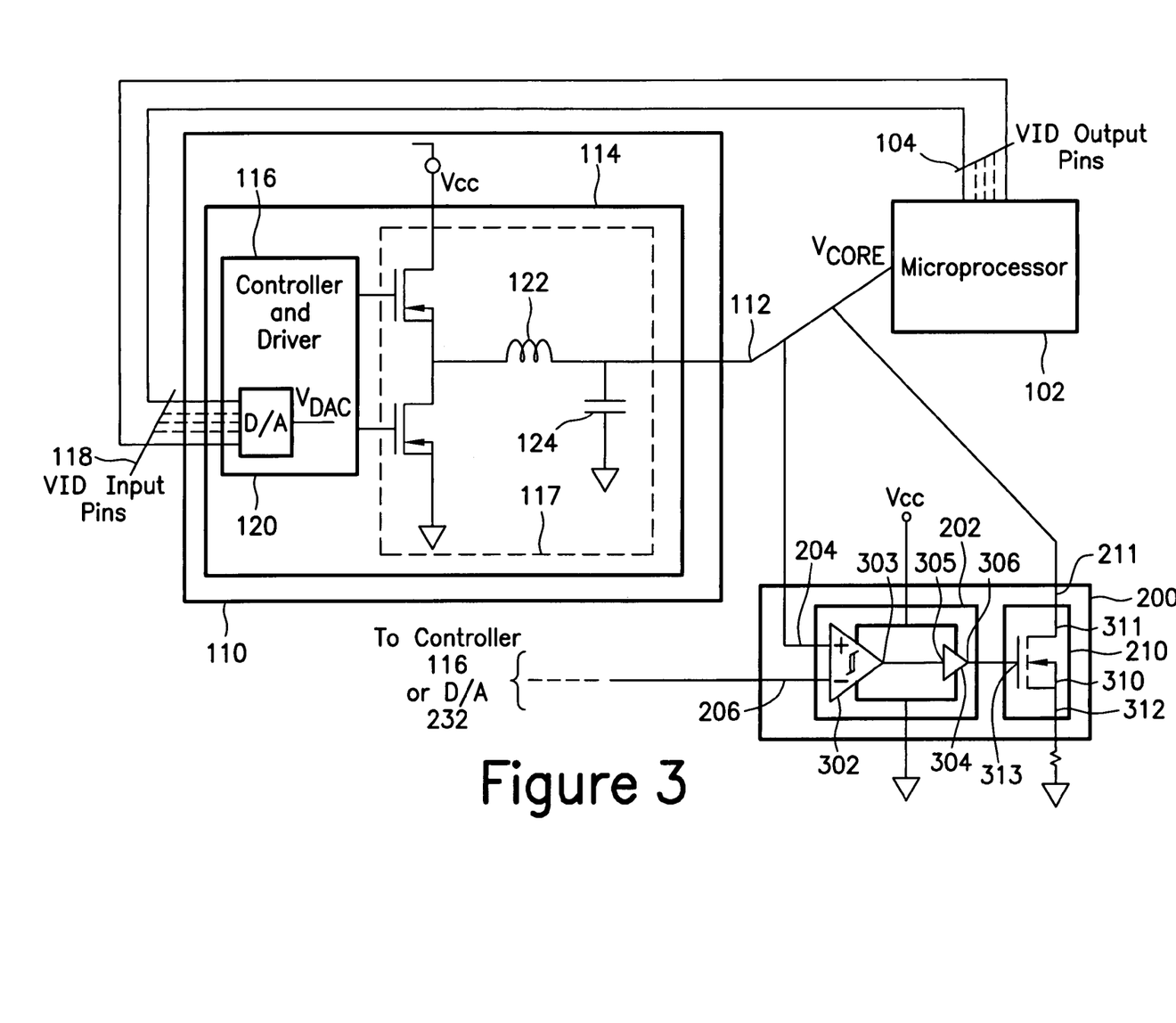
FIG. 3 shows an example implementation of a regulator for compensating for transient voltages at the output of a microprocessor power supply according to an embodiment of the invention.

Referring now to FIG. 3, there is shown an example implementation of regulator 200 according to an embodiment of the invention. Ground path switch 210 may be a transistor or MOSFET 310, for example, with a source 311 connected to output 112 of power supply 110, a drain 312 connected to ground, and a gate 313 connected to an output of energy waste-gate 202. Waste-gate 202 may include a voltage comparator 302 and a gate driver 304. Sense line 204 of the waste-gate is connected between the non-inverting input of comparator 302 and power supply output 112. Reference line 206 of the waste-gate is connected to the inverting input of the comparator and may be connected to either controller 116 or to the microprocessor through a digital-to-analog converted 232, for example, as described above. The output 303 of comparator 302 is connected to the input 305 of gate driver 304. The output of 306 of the gate driver is connected to gate 313 of transistor/MOSFET 310. The output 303 of voltage comparator 302 preferably switches with histerysis and may switch, for example, around a threshold corresponding to the voltage tolerance band of microprocessor 102.

According to an example operation according to an embodiment of the invention, comparator 302 compares the output voltage of power supply 110 against the microprocessor's desired voltage set-point. As the power supply output voltage exceeds the voltage set-point by a threshold, for example, the output 303 of the comparator goes high, causing gate driver 304 to turn transistor/MOSFET 310 on, thereby providing a path to ground for the power supply output 112.

With the provision of the path to ground, the output voltage on output 112 begins to reduce, bringing the voltage on the power supply output back towards the voltage set-point. Once the voltage on the power supply output 112 falls to within the threshold of the voltage set-point, for example, output 303 of the comparator goes low, causing driver 306 to turn transistor/MOSFET 310 off, thereby eliminating the path to ground for the power supply output.

As illustrated in FIG. 3, waste-gate 202 may be provided as an integrated circuit that includes both voltage comparator 302 and gate driver 304. Alternatively, waste-gate 202 may be integrated with controller 116. As another alternative, regulator 200 may be integrated with voltage regulator 114. Of course, one skilled in the art will recognize that other configurations are possible. In addition, one skilled in the art will recognize that regulator 200 may be implemented in ways other than that shown in FIG. 3.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A regulator for reducing a transient voltage on a power supply output connected to a microprocessor, comprising:
   a switch connected between the power supply output and ground; and
   a waste-gate that includes
      a first input connected to the power supply output for sensing an output voltage,
      a second input for receiving a reference voltage, and
      an output connected to the switch,
   wherein the waste-gate operates to close the switch and connect the power supply output to ground when the output voltage exceeds the reference voltage, thereby shunting energy in the power supply to ground, and to open the switch as the output voltage moves back towards the reference voltage; and
   wherein the waste-gate operates to close the switch as the output voltage exceeds the reference voltage by a threshold, wherein the power supply output supplies power to the microprocessor and wherein the threshold is based on a voltage tolerance band of the microprocessor.

2. The regulator of claim 1, wherein the waste-gate comprises a voltage comparator that compares the output voltage against the reference voltage to produce an output that operates the switch.

3. The regulator of claim 2, wherein the output of the voltage comparator switches with hysteresis.

4. The regulator of claim 2, wherein the waste-gate further comprises a gate driver between the output of the voltage comparator and the switch.

5. The regulator of claim 4, wherein the switch is either a transistor or a MOSFET with a gate connected to the gate driver.

6. The regulator of claim 5, wherein the voltage comparator and the gate driver are packaged as an integrated circuit.

7. The regulator of claim 1, wherein the power supply output supplies power to the microprocessor and wherein the reference voltage is derived from a voltage identification signal provided by the microprocessor.

8. The regulator of claim 1, wherein the power supply output is an output stage of a voltage regulator.

9. The regulator of claim 8, wherein the reference voltage is obtained from a controller of the voltage regulator.

10. A method for reducing a voltage transient at a power supply output connected to a microprocessor, comprising:
    sensing an output voltage on the power supply output;
    obtaining a reference voltage;
    closing a switch to connect the power supply output to ground when the output voltage exceeds the reference voltage, thereby indicating a voltage transient;
    draining excess energy from the power supply; and
    opening the switch when the output voltage moves back towards the reference voltage, thereby reducing the voltage transient; and
    wherein the switch closing step comprises closing the switch when a difference between the output voltage and the reference voltage exceeds a threshold, wherein power supply output supplies power to the microprocessor and wherein the threshold is based on a voltage tolerance band of the microprocessor.

11. The method of claim 10, wherein the power supply output supplies power to the microprocessor and wherein the obtaining step obtains the reference voltage from a voltage identification signal provided by the microprocessor.

12. The method of claim 10, wherein the power supply output is an output stage of a voltage regulator.

13. The method of claim 12, wherein the obtaining step obtains the reference voltage from a controller of the voltage regulator.

14. The method of claim 10, wherein the power supply output supplies power to the microprocessor, the method further comprising the step of switching the microprocessor from a high frequency mode to a low frequency mode, thereby creating the voltage transient.

* * * * *